United States Patent
Trappe et al.

(10) Patent No.: US 6,896,310 B1
(45) Date of Patent: May 24, 2005

(54) INSTRUMENT PANEL SYSTEM WITH HIDDEN AIRBAG DOOR

(75) Inventors: Adam Kenneth Trappe, Chesterfield Twp., MI (US); Ronald King, Pittsfield, MA (US); Jessie A. Goyette, Pittsfield, MA (US); Kurt Albert Weiss, Stephentown, NY (US)

(73) Assignee: General Electric Company, Schenectady, NY (US)

( * ) Notice: Subject to any disclaimer, the term of this patent is extended or adjusted under 35 U.S.C. 154(b) by 24 days.

(21) Appl. No.: 10/706,899

(22) Filed: Nov. 13, 2003

(51) Int. Cl.$^7$ .............................................. B62D 25/14
(52) U.S. Cl. ...................... 296/70; 280/728.3; 280/732
(58) Field of Search ............................... 296/70, 37.12, 296/37.8, 1.04, 190.3, 187.05; 280/728.3, 280/728.2, 730.2, 743.1, 730.1, 731, 728.1, 280/729, 752; 273/317.1; 417/287

(56) References Cited

U.S. PATENT DOCUMENTS

| | | | |
|---|---|---|---|
| 3,385,217 A * | 5/1968 | Bles | ............................ 417/287 |
| 5,338,059 A | 8/1994 | Inoue | |
| 5,342,088 A * | 8/1994 | Bauer | ...................... 280/728.3 |
| 5,458,361 A * | 10/1995 | Gajewski | .................... 280/28.3 |
| 5,482,273 A * | 1/1996 | Wilton | ..................... 273/317.1 |
| 5,564,733 A * | 10/1996 | Duenas et al. | ............ 280/728.3 |
| 5,641,554 A | 6/1997 | Koizumi | |
| 5,685,560 A | 11/1997 | Sugiyama et al. | |
| 5,839,752 A | 11/1998 | Yamasaki et al. | |
| 5,845,929 A | 12/1998 | Schlett et al. | |
| 5,863,064 A * | 1/1999 | Rheinlander et al. | ..... 280/728.3 |
| 5,899,495 A * | 5/1999 | Yamamoto et al. | ....... 280/743.1 |
| 5,979,931 A | 11/1999 | Totani et al. | |
| 6,042,140 A | 3/2000 | Blazaitis et al. | |
| 6,106,003 A * | 8/2000 | Rahmstorf et al. | ....... 280/728.3 |
| RE37,540 E * | 2/2002 | Iannazzi et al. | .......... 280/728.3 |
| 6,533,314 B2 * | 3/2003 | Merrifield et al. | ........ 280/728.3 |
| 6,709,007 B2 * | 3/2004 | Gray et al. | .............. 280/728.3 |
| 2002/0153710 A1 * | 10/2002 | Gray et al. | .............. 280/728.3 |
| 2004/0160043 A1 * | 8/2004 | Litjens et al. | ................ 280/732 |

* cited by examiner

*Primary Examiner*—Kiran Patel
(74) *Attorney, Agent, or Firm*—Armstrong Teasdale LLP

(57) ABSTRACT

An instrument panel includes, in an exemplary embodiment, a thermoplastic base substrate having a first surface and an opposing second surface, and a door portion defined by a tear seam notch in the first surface of the base substrate. The tear seam notch defines a periphery of the door portion. The instrument panel also includes at least one hinge portion defined by a plurality of tear seam notches in the first surface of the base substrate. Each hinge portion interrupts the door portion tear seam notch so that the door portion tear seam notch is not continuous.

17 Claims, 4 Drawing Sheets

INSTRUMENT PANEL SYSTEM WITH HIDDEN AIRBAG DOOR

BACKGROUND OF THE INVENTION

This invention relates generally to instrument panel assemblies, and more particularly to an instrument panel having a hidden airbag door.

Known instrument panel assemblies include a beam structure and at least one decorative instrument panel attached to the beam structure. Some of the decorative panels act as knee bolsters to protect the knees of vehicle occupants in the event of an impact. An instrument panel assembly is mounted inside the passenger compartment of an automobile with the beam structure attached to the automobile body, typically to the A-pillar. Known instrument panel beam structures are fabricated from steel or plastic.

A number of vehicle systems are housed within the instrument pane assembly, for example, the heating, ventilating, and air conditioning (HVAC) system, and the airbag system(s). To permit deployment of the airbag, the instrument panel includes a airbag opening covered by an airbag door. The placement of a door in the middle of a smooth surfaced instrument panel is considered as aesthetically unacceptable because the door destroys the clean aesthetic lines of an instrument panel. The deployment of the airbag forces the door open to permit the airbag to exit through the opening in the instrument panel.

A known instrument panel having a hidden airbag door includes a molded base substrate that is either covered with a semi-rigid foam and a cover material, painted, or left unpainted. The underside of the instrument panel base substrate is scored with a laser to create a deployment seam in the shape of a door. A separate metal hinge assembly is molded into the back of the door and the underside of the base substrate to permit the door to pivot open during airbag deployment. The force of the airbag deployment forces the deployment seam to separate permitting the door to be forced open. If required, the door is also forced through the surface foam layer and the cover layer of the instrument panel so the airbag can exit the instrument panel. The underside of the cover layer has either a seam that is molded in, or is laser scored to facilitate the door breaking through the cover. The multiple components of the airbag door hinge increases complexity of fabrication and assembly which increases fabrication time and increases labor costs.

BRIEF DESCRIPTION OF THE INVENTION

In one aspect, an instrument panel is provided. The instrument panel includes a thermoplastic base substrate having a first surface and an opposing second surface, and a door portion defined by a tear seam notch in the first surface of the base substrate. The tear seam notch defines a periphery of the door portion. The instrument panel also includes at least one hinge portion defined by a plurality of tear seam notches in the first surface of the base substrate. Each hinge portion interrupts the door portion tear seam notch so that the door portion tear seam notch is not continuous.

In another aspect, an instrument panel system is provided that includes an instrument panel and an airbag. The air bag is positioned adjacent the instrument panel. The instrument panel includes a thermoplastic base substrate having a first surface and an opposing second surface, and a door portion defined by a tear seam notch in the first surface of the base substrate. The tear seam notch defines a periphery of the door portion. The instrument panel also includes at least one hinge portion defined by a plurality of tear seam notches in the first surface of the base substrate. Each hinge portion interrupts the door portion tear seam notch so that the door portion tear seam notch is not continuous.

In another aspect, a thermoplastic panel that includes a hidden airbag door is provided. The thermoplastic panel also includes a thermoplastic base substrate having a first surface and an opposing second surface, and a tear seam notch in the first surface of the base substrate. The tear seam notch defines a periphery of the airbag door. The thermoplastic panel further includes at least one hinge portion defined by a plurality of tear seam notches in the first surface of the base substrate. Each hinge portion interrupts the airbag door tear seam notch so that the airbag door tear seam notch is not continuous.

DETAILED DESCRIPTION OF THE INVENTION

An instrument panel system that includes an instrument panel with a hidden airbag door is described below in more detail. The airbag door is not visible to vehicle occupants before deployment of the airbag. The hidden airbag door is self-hinging and opens by the force of the airbag deploying and permits the airbag to exit the instrument panel and enter the passenger compartment. The opened airbag door includes smooth surfaces without sharp and/or hard edges to avoid vehicle occupant injuries.

Figure 1:
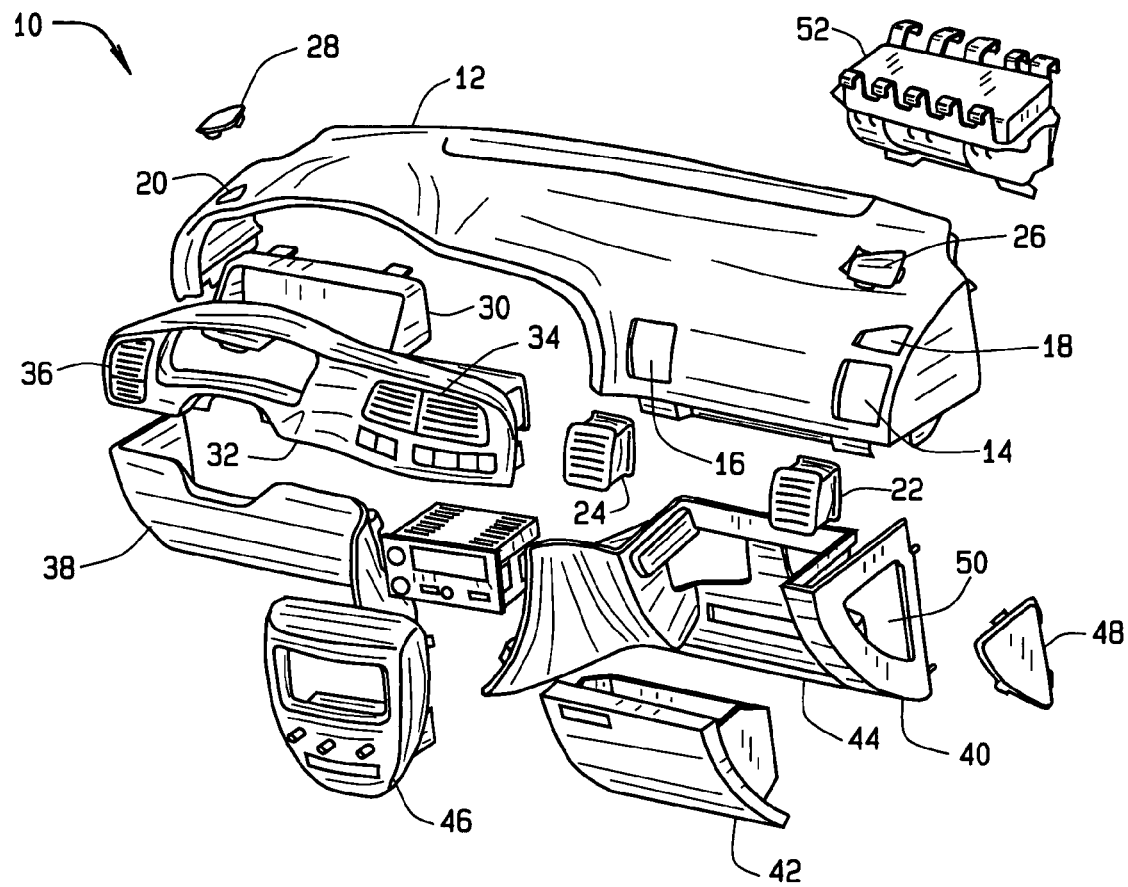
FIG. 1 is a perspective view of an instrument panel assembly in accordance with an embodiment of the present invention.

Referring to the drawings, FIG. 1 is an exploded perspective view of an instrument panel assembly 10 in accordance with an exemplary embodiment of the present invention. Instrument panel assembly 10 includes an instrument panel 12 having duct outlet openings 14, 16, 18, and 20. Vent grills 22, 24, 26, and 28 are sized to mate with openings 14, 16, 18, and 20 respectively. An instrument cluster 30 and a cluster trim plate 32 are coupled to instrument panel 12. Cluster trim plate 32 includes vent grills 34 and 36. A driver side knee bolster 38 and a glove box surround 40 are coupled to instrument panel 12. A glove box 42 attaches to a glove box hinge portion 44 of glove box surround 40. The combination of glove box surround 40 and glove box 42 act as a passenger knee bolster. A center bezel 46 is coupled to driver side knee bolster 38 and glove box surround 40. A fuse access door 48 covers a fuse access opening 50 in glove box surround 40. An airbag module 52 is mounted adjacent instrument panel 12.

Figure 2:
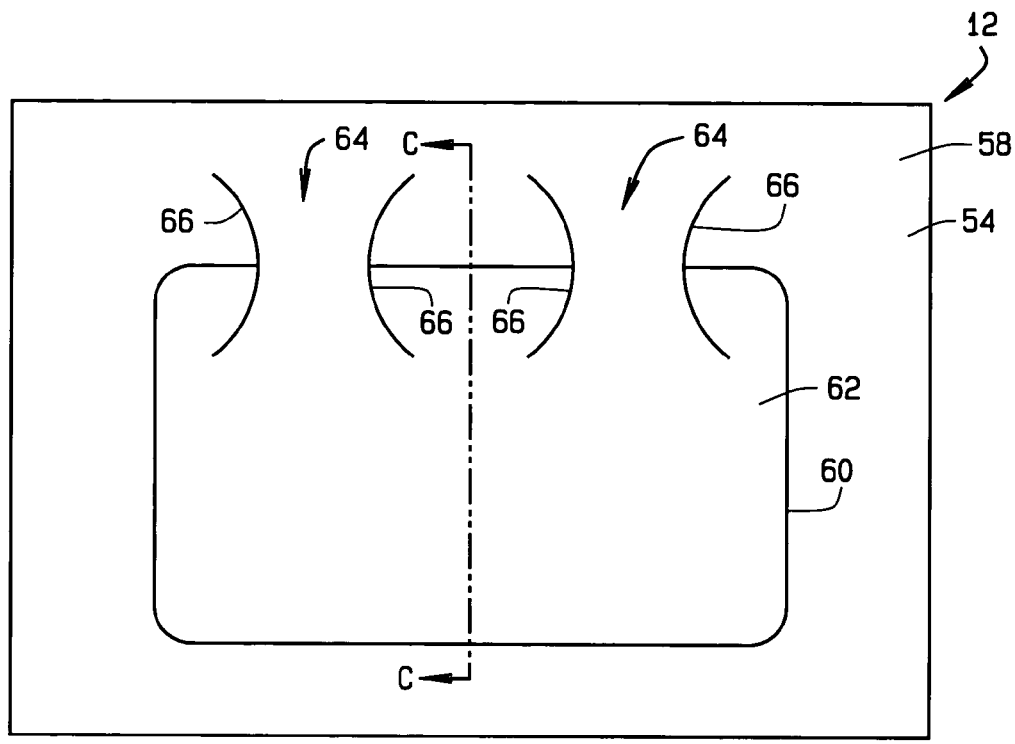
FIG. 2 is a schematic illustration of a portion of the instrument panel shown in FIG. 1 in accordance with an embodiment of the present invention.
Figure 3:
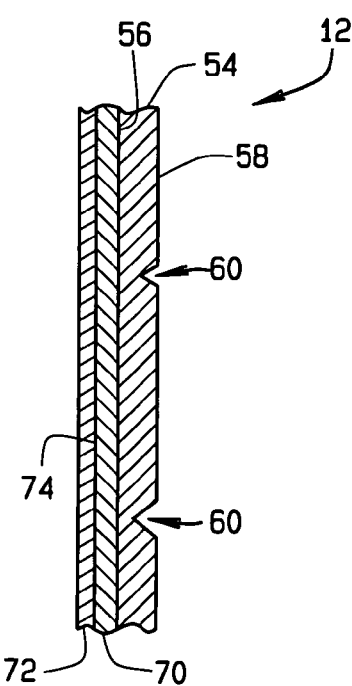
FIG. 3 is a cross sectional view of the instrument panel through line C—C of FIG. 2.
Figure 4:
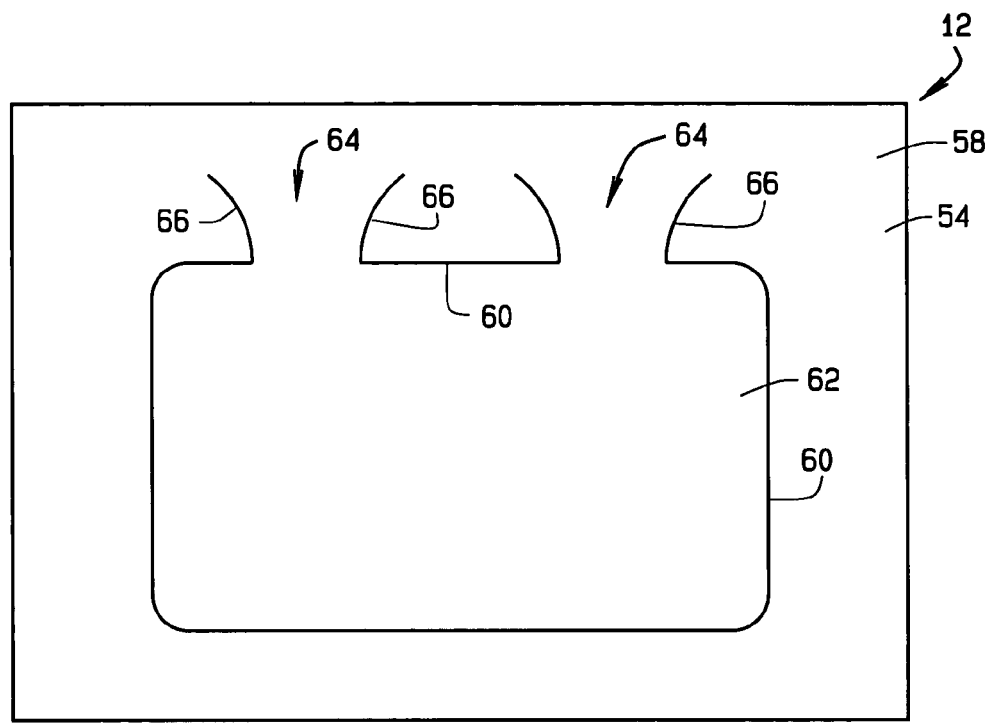
FIG. 4 is a schematic illustration of a portion of the instrument panel shown in FIG. 1 in accordance with another embodiment of the present invention.
Figure 5:
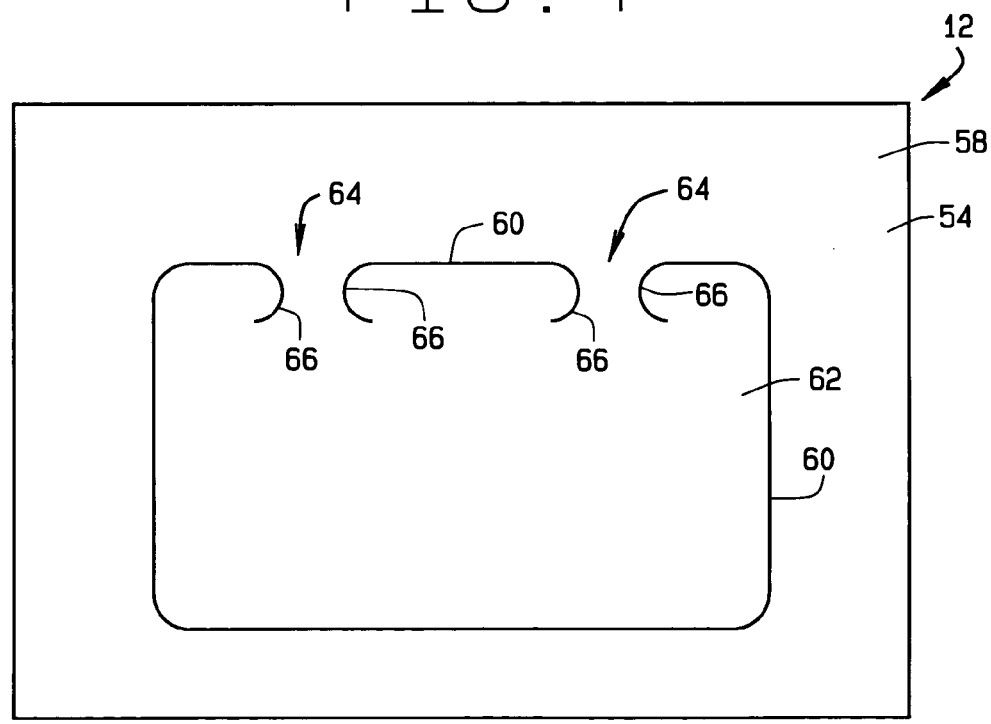
FIG. 5 is a schematic illustration of a portion of the instrument panel shown in FIG. 1 in accordance with another embodiment of the present invention.

FIG. 2 is a bottom schematic view of a portion of instrument panel 12, and FIG. 3 is a cross sectional view of instrument panel 12 through line C—C. Referring to FIGS. 2 and 3, a base substrate 54 includes an upper surface 56 and a lower surface 58. When instrument panel 12 is installed in a vehicle, upper surface 56 faces the passenger compartment and lower surface 58 faces the inside of instrument panel assembly 10. Base substrate 54 includes a tear seam notch 60 that defines the outer periphery of an airbag door 62. In this exemplary embodiment, tear seam notch 60 is located in lower surface 58 of base substrate 54. In an alternate embodiment, tear seam notch 60 is located in upper surface 56 of base substrate 54. At least one hinge portion 64 (two shown) is defined by hinge tear seam notches 66 in base substrate 54. Each hinge portion 64 is located so that it interrupts airbag door tear seam notch 60. Particularly, tear seam notch 60 is non-continuous in the area of each hinge portion 64 creating a self-hinging airbag door. Hinge portion tear seam notches 66 are substantially orthogonal to airbag door tear seam notch 60. In the exemplary embodiment, hinge portion tear seam notches 66 extend from a location in airbag door 62 to a location away from airbag door 62. In an alternate embodiment shown in FIG. 4, hinge portion tear seam notches 66 extend from airbag door tear seam notch 60 to a location away from air bag door 62. In another alternate embodiment shown in FIG. 5, hinge portion tear seam notches 66 extend from a location in airbag door 62 to airbag door tear seam notch 60.

Hinge tear seam notches 66 are curved with a relatively small radius of curvature to prevent ripping of base substrate 54 adjacent hinge tear seam notches 66. In the exemplary embodiment, the tear seam notches 66 that form each hinge portion 64 are arranged so that the width of hinge portion 64 is smallest at the intersection with airbag door tear seam notch 60. Hinge portions 64 have a thickness that is substantially equivalent to the thickness of airbag door 62 and instrument panel 12. Hinge portions 64 connect airbag door 62 to instrument panel 12 during and after an airbag deployment event which permits airbag door 62 to open allowing airbag 52 to fully inflate through instrument panel 12.

Tear seam notches 60 and 66 can be formed in base substrate 54 by any suitable method. Some suitable methods for forming tear seam notches 60 and 66 include, but are not limited to, press molding tear seam notches 60 and 66 into base substrate 54, forming tear seam notches 60 and 66 during the injection molding of base substrate 54, laser scribing tear seam notches 60 and 66 into base substrate 54, scribing tear seam notches 60 and 66 into base substrate 54 with a high pressure water stream, and scribing tear seam notches 60 and 66 into base substrate 54 with a hot knife tool. A cross-section of tear seam notches 60 and 66 can have any suitable shape, for example, a V-shape, a U-shape, a conical-shape, a spherical-shape, or a box shape.

Flexible properties of base substrate 54 permit bending and flexing of hinge portions 64 which permit airbag door 62 to open during an airbag deployment event. Base substrate 54 should be flexible at temperatures of about 100° C. to about −40° C. Base substrate 54 can be extruded or molded from one of many thermoplastic materials. Suitable thermoplastic materials include, but are not limited to, acrylonitrile-butadiene-styrene (ABS), polycarbonate (LEXAN® and LEXAN® EXL resins commercially available from General Electric Company), polycarbonate/ABS blend, a copolycarbonate-polyester, acrylic-styrene-acrylonitrile (ASA), acrylonitrile-(ethylene-polypropylene diamine modified)-styrene (AES), phenylene ether resins, glass filled blends of polyphenylene oxide and polystyrene, blends of polyphenylene ether/polyamide (NORYL GTX® resins from General Electric Company), blends of polycarbonate/PET/PBT, polybutylene terephthalate and impact modifier (XENOY® resins commercially available from General Electric Company), polyamides, phenylene sulfide resins, polyvinyl chloride PVC, high impact polystyrene (HIPS), low/high density polyethylene, polypropylene and thermoplastic olefins (TPO), polyethylene and fiber composites, and polypropylene and fiber composites such as AZDEL Superlite™ sheets commercially available from AZDEL, Inc.

Referring to FIG. 3, instrument panel 12 includes an intermediate layer 70 on upper surface 56 of base substrate 54 and a cover layer 72 on upper surface 74 of intermediate layer 70. In an alternate embodiment, instrument panel 12 does not have any additional layers on upper surface 56 of base substrate 54. In another embodiment, upper surface 56 of base substrate 54 is be painted. Intermediate layer 70 is formed from a resilient material, for example, a foam material. The resilient material provides protection to vehicle occupants in impact events. Cover layer 72 is formed from any suitable decorative material, for example, a thermoplastic material, leather, fabric, and the like. With the application of intermediate layer 70 and cover layer 72 to base substrate 54, airbag door 62 is not visible to a vehicle occupant. In the exemplary embodiment, intermediate layer 70 and cover layer 72 do not contain tear seam scores or notches to aid the opening of airbag door 62. In other embodiments, at least one of intermediate layer 70 and cover layer 72 also include tear seam notches.

In operation, during an airbag deployment event, airbag 52 inflates and imparts a force on instrument panel 12. The force causes tear seam notches 60 and 66 to open and causes airbag door 62 to move to an open position by breaking through intermediate layer 70 and cover layer 72. With airbag door 62 and in an open position, airbag 52 can fully inflate through instrument panel 12. Open airbag door 62 has smooth surfaces without sharp/hard edges to avoid vehicle occupant injuries.

Figure 6:
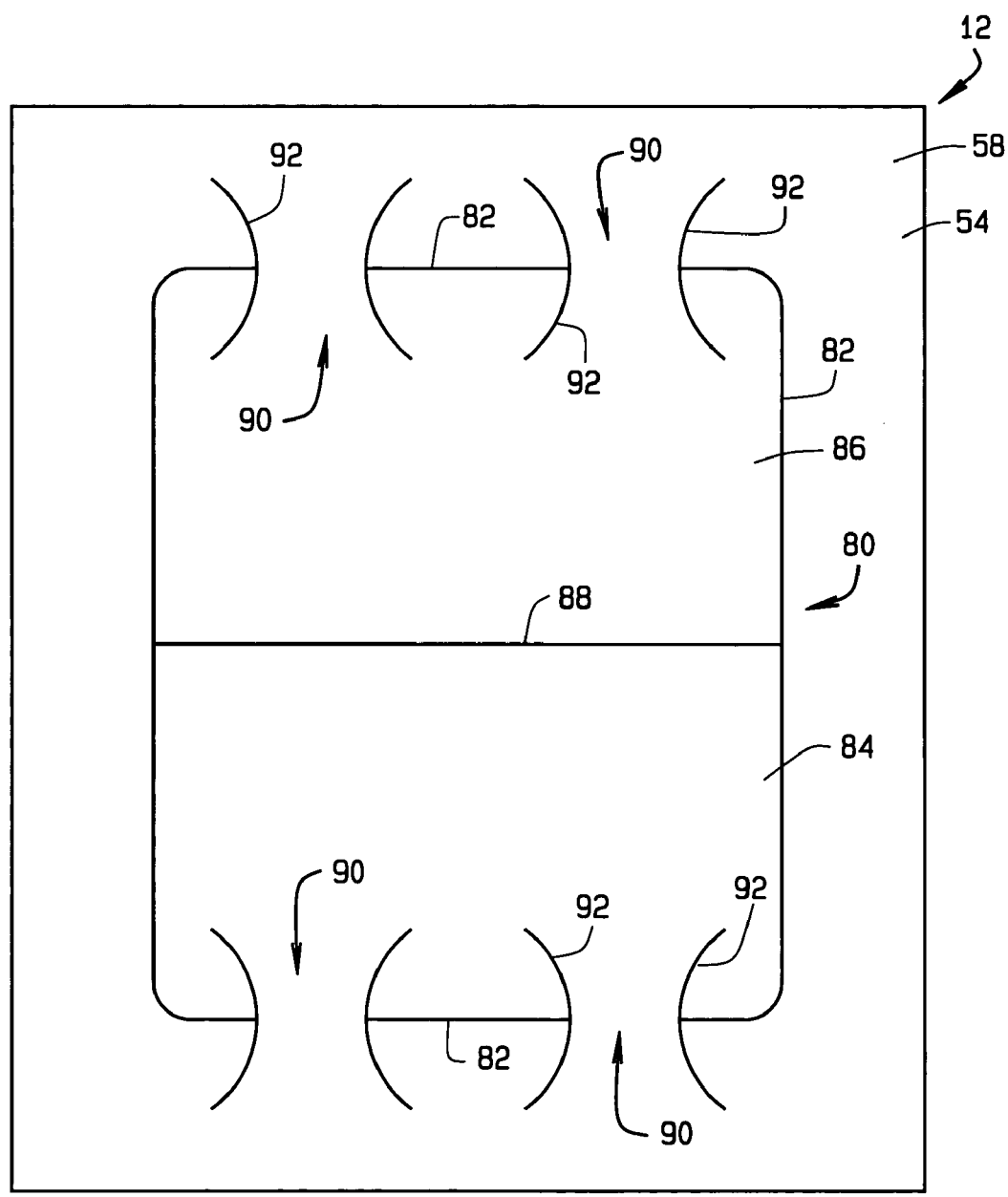
FIG. 6 is a schematic illustration of a portion of the instrument panel shown in FIG. 1 in accordance with another embodiment of the present invention.

FIG. 6 is a schematic illustration of a portion of instrument panel 12 in accordance with another exemplary embodiment of the present invention. An outer periphery of an airbag door 80 in instrument panel 12 is defined by a tear seam notch 82 located in lower surface 58 of base substrate 54. Air bag door 80 includes segments 84 and 86 and includes a segment tear seam notch 88 located between segments 84 and 86 and intersecting airbag door tear seam notch 82 at each end. Particularly, the outer periphery of airbag door segments 84 and 86 are defined by airbag door tear seam notch 82 and segment tear seam notch 88. The exemplary embodiment shown in FIG. 6 has two airbag door segments 84 and 86; however, in alternate embodiments air bag door 80 can have more than two door segments and more than one segment tear seam notch to define the door segments.

At least one hinge portion 90 is defined by hinge tear seam notches 92 in base substrate 54. Each hinge portion 90 is located so that it interrupts airbag door tear seam notch 82. Particularly, tear seam notch 82 is non-continuous in the area of each hinge portion 90. Hinge portion tear seam notches 92 are substantially orthogonal to airbag door tear seam notch 82 and extend from a location in airbag door segment 84 or 86 to a location away from airbag door 80. Each door segment 84 and 86 are connected to instrument panel 12 by at least one hinge portion 90. In an alternate embodiment hinge portion tear seam notches 92 extend from airbag door tear seam notch 82 to a location away from air bag door segment 84 or 86. In another alternate embodiment hinge portion tear seam notches 92 extend from a location in airbag door segment 84 or 86 to airbag door tear seam notch 82. Hinge tear seam notches 92 are curved with a relatively small radius of curvature to prevent ripping of base substrate 54 adjacent hinge tear seam notches 92. In the exemplary embodiment, the tear seam notches 92 that form each hinge portion 90 are arranged so that the width of hinge portion 90 is smallest at the intersection with airbag door tear seam notch 82.

While the invention has been described in terms of various specific embodiments, those skilled in the art will recognize that the invention can be practiced with modification within the spirit and scope of the claims.

What is claimed is:

1. An instrument panel comprising:
   a thermoplastic base substrate having a first surface and an opposing second surface;
   a door portion defined by a tear seam notch in at least one of said first surface and said second surface of said base substrate, said tear seam notch defining a periphery of said door portion; and
   at least one hinge portion defined by a plurality of tear seam notches in at least one of said first surface and said second surface of said base substrate, each said hinge portion interrupting said door portion tear seam notch so that said door portion tear seam notch is not continuous.

2. The instrument panel in accordance with claim 1 wherein said hinge portion tear seam notches are substantially orthogonal to said door portion tear seam notch.

3. The instrument panel in accordance with claim 1 wherein said hinge portion tear seam notches extend from said door portion tear seam notch away from said door portion.

4. The instrument panel in accordance with claim 1 wherein said hinge portion tear seam notches extend from inside said door portion to a location outside said door portion.

5. The instrument panel in accordance with claim 1 wherein said hinge portion tear seam notches extend from inside said door portion to said door portion tear seam notch.

6. The instrument panel in accordance with claim 1 wherein said hinge portion tear seam notches comprise a curved shape.

7. The instrument panel in accordance with claim 1 wherein said door portion comprises a plurality of segments, said segments defined by said door portion tear seam notch and at least one segment tear seam notch, each segment tear seam notch intersecting said door portion tear seam notch.

8. An instrument panel system comprising an instrument panel and an airbag, said air bag positioned adjacent said instrument panel, said instrument panel comprising:
   a thermoplastic base substrate having a first surface and an opposing second surface;
   a door portion defined by a tear seam notch in at least one of said first surface and said second surface of said base substrate, said tear seam notch defining a periphery of said door portion; and
   at least one hinge portion defined by a plurality of tear seam notches in at least one of said first surface and said second surface of said base substrate, each said hinge portion interrupting said door portion tear seam notch so that said door portion tear seam notch is not continuous.

9. The instrument panel system in accordance with claim 8 wherein said hinge portion tear seam notches are substantially orthogonal to said door portion tear seam notch.

10. The instrument panel system in accordance with claim 8 wherein said hinge portion tear seam notches extend from said door portion tear seam notch away from said door portion.

11. The instrument panel system in accordance with claim 8 wherein said hinge portion tear seam notches extend from inside said door portion to a location outside said door portion.

12. The instrument panel system in accordance with claim 8 wherein said hinge portion tear seam notches extend from inside said door portion to said door portion tear seam notch.

13. The instrument panel system in accordance with claim 8 wherein said hinge portion tear seam notches comprise a curved shape.

14. The instrument panel system in accordance with claim 8 wherein said door portion comprises a plurality of segments, said segments defined by said door portion tear seam notch and at least one segment tear seam notch, each segment tear seam notch intersecting said door portion tear seam notch.

15. The instrument panel system in accordance with claim 8 wherein said instrument panel further comprises an intermediate layer adjacent said second surface of said base substrate, said intermediate layer comprising a resilient material.

16. The instrument panel system in accordance with claim 15 wherein said resilient material comprises a foam material.

17. The instrument panel system in accordance with claim 15 wherein said instrument panel further comprises an outer layer adjacent said intermediate layer.

* * * * *